United States Patent
Nishita et al.

(10) Patent No.: US 9,739,610 B2
(45) Date of Patent: Aug. 22, 2017

(54) SYSTEM OF MEASURING THREE-DIMENSIONAL POSITION

(71) Applicant: Kabushiki Kaisha TOPCON, Tokyo (JP)

(72) Inventors: Nobuyuki Nishita, Tokyo (JP); Kaoru Kumagai, Tokyo (JP)

(73) Assignee: KABUSHIKI KAISHA TOPCON, Tokyo (JP)

(*) Notice: Subject to any disclaimer, the term of this patent is extended or adjusted under 35 U.S.C. 154(b) by 87 days.

(21) Appl. No.: 15/001,326

(22) Filed: Jan. 20, 2016

(65) Prior Publication Data

US 2016/0216110 A1    Jul. 28, 2016

(30) Foreign Application Priority Data

Jan. 28, 2015 (JP) .................... 2015-014022
Mar. 5, 2015 (JP) .................... 2015-043533

(51) Int. Cl.

| G06K 9/00 | (2006.01) |
| G01C 3/08 | (2006.01) |
| G01C 9/06 | (2006.01) |
| G01C 15/00 | (2006.01) |

(52) U.S. Cl.
CPC ............... G01C 3/08 (2013.01); G01C 9/06 (2013.01); G01C 15/008 (2013.01); G01C 2009/066 (2013.01)

(58) Field of Classification Search
None
See application file for complete search history.

(56) References Cited

U.S. PATENT DOCUMENTS

| 5,809,658 A * | 9/1998 | Jackson | G01B 11/2755 |
| | | | 33/203.18 |
| 6,782,015 B1 * | 8/2004 | Kawatani | G01C 15/004 |
| | | | 372/24 |
| 7,184,088 B1 * | 2/2007 | Ball | G01C 11/02 |
| | | | 348/348 |
| 9,605,957 B2 * | 3/2017 | Nishita | G01C 5/00 |
| 2001/0055484 A1 * | 12/2001 | Kochi | G03B 35/00 |
| | | | 396/324 |

(Continued)

FOREIGN PATENT DOCUMENTS

| JP | 3735422 B | 10/2005 |
| JP | 2010-223754 A | 10/2010 |

*Primary Examiner* — Andrae S Allison
(74) *Attorney, Agent, or Firm* — Roberts Mlotkowski Safran Cole & Calderon P.C.

(57) ABSTRACT

A system including a pointing rod 4 positioned on a measurement point X, a prism 3 fixed at a position deviated by a first fixed length L1 from the measurement point X in an axial direction PP of the pointing rod 4, an inclination casing 5 for fixing an analysis pattern 41 located at a position deviated by a second fixed length L2 from the prism 3 in an axial direction of the pointing rod 4 and is perpendicular to a surface with respect to the axial direction of the pointing rod 4, and a survey machine 2 having an image-taking section 22, a section of measuring a distance to the prism, and a section of measuring an angle 11,12. The position of the measurement point is measured from a position of the prism 3, an inclination direction A of the pointing rod 4, and the first fixed length L1.

7 Claims, 17 Drawing Sheets

(56) References Cited

U.S. PATENT DOCUMENTS

| | | | |
|---|---|---|---|
| 2014/0307252 A1* | 10/2014 | Hinderling | G01C 15/006 356/141.4 |
| 2014/0336479 A1* | 11/2014 | Ando | A61B 5/4041 600/310 |
| 2015/0098075 A1* | 4/2015 | Bestler | G01C 15/002 356/3.01 |
| 2015/0354954 A1* | 12/2015 | Nishita | G01C 15/002 33/292 |
| 2016/0061595 A1* | 3/2016 | Nishita | G01C 9/20 356/152.2 |
| 2016/0216109 A1* | 7/2016 | Kumagai | H04N 7/181 |

* cited by examiner

Fig. 20 ( a )
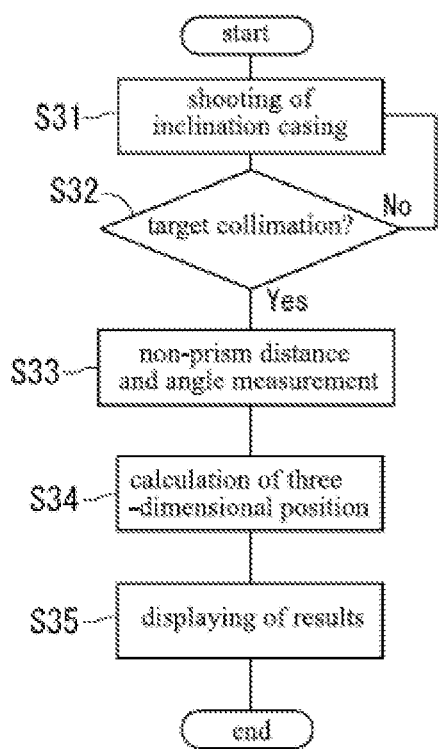
Fig. 20 ( b )
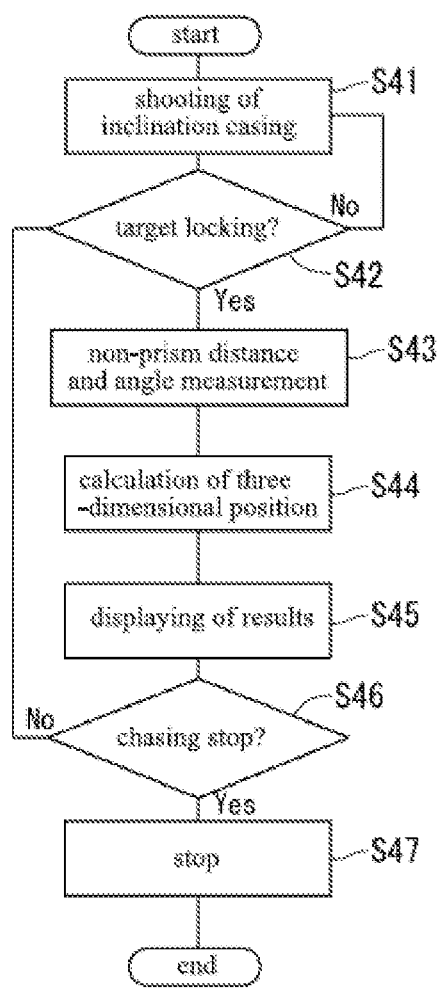

SYSTEM OF MEASURING THREE-DIMENSIONAL POSITION

TECHNICAL FIELD

The present invention relates to a system of measuring a three-dimensional position of a measurement point, and, especially, to the system measuring the three-dimensional position of the measurement point by using a pointing rod having a prism fixed at a position deviated by a known fixed length from the measurement point.

BACKGROUND ART

In the field of surveying, measurement, or BIM (Building Information Molding), a three-dimensional position of a measurement point is measured by generally using a surveying machine for measuring a distance and an angle, and a retroreflection prism. In this measurement, the optical reflecting point of the prism cannot be directly placed on the measurement point because the prism has a specified dimension. Accordingly, the prism is usually fixed to a pointing rod (or a pointing stand).

More in detail, after the front end of the pointing rod is placed on the measurement point, and the prism is fixed at the position deviated by a known fixed length from the measurement point, the three-dimensional position measurement of the prism is performed while the vertical situation of the pointing rod is secured by using a bubbler tube. Then, the three-dimensional position of the measurement point is calculated by moving the measured value toward the downward direction by the above fixed length. However, this method is not applicable to a measurement in which the pointing rod is inclined such as for a room corner.

On the other hand, another system of measuring a three-dimensional position is proposed in which the measurement can be conducted if the pointing rod is inclined from the measurement point. For example, in Patent Publication 1, after two reflection prisms are fixed and separated from each other by a known length on a pointing rod, the two points of the prisms are measured for calculating the position of the measurement point from the two three-dimensional positions. In Patent Publication 2, the position of the measurement point is calculated by using values of an incident angle sensor and an inclination sensor possessed by a pointing rod.

PRIOR TECHNICAL PUBLICATIONS

Patent Publications

Patent Publication 1: JP-B-3735422
Patent Publication 1: JP-A-2010-223754

SUMMARY OF INVENTION

Problems to be Solved by Invention

However, in the configuration of Patent Publication 1, the two positions cannot be measured simultaneously so that a restriction exists that the prisms must be motionless during the measurement of the two points. When a far distance is present between the two prisms, the two prisms must be disadvantageously separated. The configuration of Patent Publication 2 requires high cost due to the mounting of a new sensor.

The present invention has been made to overcome these disadvantages, and an object thereof is to provide a system of measuring a three-dimensional position in which an measurement can be performed without any particular restrictions even if a pointing rod is inclined extending from a measurement point.

Means of Solving Problems

The present invention (claim 1) for achieving the object has the configuration of a system of measuring a three-dimensional position of a measurement point, the system including, a pointing rod positioned on the measurement point, a prism fixed at a position deviated by a known first fixed length from the measurement point in an axial direction of the pointing rod, an inclination casing for fixing an analysis pattern which is located at a position deviated by a known second fixed length from the prism in the axial direction of the pointing rod and is located on a plane perpendicular to the axial direction of the pointing rod; and, a survey machine including a section of measuring a distance to the prism, a section of measuring an angle, and an image-taking section, the three-dimensional position of the measurement point being measured from a three-dimensional position of the prism obtained in the sections of measuring the distance and the angle, an inclination direction of the pointing rod obtained from an image obtained by imaging the inclination casing by means of the image-taking section, and the first fixed length.

A system of measuring a three-dimensional position of a measurement point in accordance with a certain embodiment includes a pointing rod positioned on the measurement point, a prism fixed at a position deviated by a known first fixed length from the measurement point in an axial direction of the pointing rod, an inclination casing for fixing an analysis pattern which is located at a position deviated by a known second fixed length from the prism in the axial direction of the pointing rod and is located on a plane perpendicular to the axial direction of the pointing rod, a survey machine including a section of measuring a distance to the prism, a section of measuring an angle, an image-taking section of shooting a surrounding scene, and a prism image-taking section of shooting the prism, the three-dimensional position of the measurement point being measured from a three-dimensional position of the prism obtained in the sections of measuring the distance and the angle after imaging the prism with the prism image-taking section for collimating the prism, an inclination direction of the pointing rod obtained by an image obtained from imaging the inclination casing by means of the image-taking section, and the first fixed length.

In the above embodiments, the system includes, obtaining a three-dimensional position of a prism center of the prism in the sections of measuring the distance and the angle, calculating a pattern center of the analysis pattern by analyzing the image obtained by means of imaging the inclination casing, calculating a positional direction of the inclination casing from the pattern center and the prism center on the image, calculating the three-dimensional position of the pattern center to which a distance from the three-dimensional position of the prism center on the positional direction of the inclination casing is the second fixed length, and measuring the three-dimensional position of the measurement point by moving positional information from the three-dimensional position of the prism center in a direction along a line between three-dimensional position of the pattern center and the three-dimensional position of the prism center by the first fixed length.

In the pointing rod used in the system of measuring the three-dimensional position of the measurement point in accordance with the above embodiments, the prism is fixed to the position deviated from the measurement point by the known first fixed length in the axial direction of the pointing rod, the inclination casing fixes the analysis pattern which is located at the position deviated by the known second fixed length from the prism in the axial direction of the pointing rod and is located on the plane perpendicular to the axial direction of the pointing rod.

In order to achieve the above object, a method of measuring a three-dimensional position of a measurement point may include the steps of, by using a pointing rod positioned on the measurement point, a prism fixed at a position separated by using a pointing rod positioned on the measurement point, a prism fixed at a position deviated by a known first fixed length from the measurement point in an axial direction of the pointing rod, an inclination casing for fixing an analysis pattern which is located at a position deviated by a known second fixed length from the prism in the axial direction of the pointing rod and is located on a plane perpendicular to the axial direction of the pointing rod, and a survey machine including a section of measuring a distance to the prism, a section of measuring an angle, and an image-taking section, obtaining a three-dimensional position of a prism center of the prism in the sections of measuring the distance and the angle, calculating a pattern center of the analysis pattern by analyzing an image obtained by imaging the inclination casing, calculating a positional direction of the inclination casing from the pattern center and the prism center on the image, calculating a three-dimensional position of the pattern center which is deviated from the three-dimensional position of the prism center by the second fixed length on the positional direction of the inclination casing, and measuring the three-dimensional position of the measurement point by moving positional information from the three-dimensional position of the prism center in a direction along a line between the three-dimensional position of the pattern center and the three-dimensional position of the prism center by the first fixed length.

A system of measuring a three-dimensional position of a measurement point in accordance with a further embodiment includes a pointing rod positioned on the measurement point, a target fixed at a position deviated by a known first fixed length from the measurement point in an axial direction of the pointing rod, an inclination casing for fixing an analysis pattern which is located at a position deviated by a known second fixed length from the target in the axial direction of the pointing rod and is located on a plane perpendicular to the axial direction of the pointing rod, and a survey machine including a section of measuring a distance to the target, a section of measuring an angle, and an image-taking section, wherein an inclination casing for fixing an analysis pattern which is located at a position deviated by a known second fixed length from the target in the axial direction of the pointing rod and is located on a plane perpendicular to the axial direction of the pointing rod, a three-dimensional position of the target center is obtained in the sections of measuring the distance and the angle, a positional direction of the inclination casing is calculated from the pattern center and the target center on the image, a three-dimensional position of the pattern center is calculated which is deviated from the three-dimensional position of the target center by the second fixed length in the positional direction of the inclination casing, and the three-dimensional position of the measurement point is measured by moving positional information from the three-dimensional position of the target center in a direction along a line between the three-dimensional position of the pattern center and the three-dimensional position of the target center by the first fixed length.

A system of measuring a three-dimensional position of a measurement point in accordance with a still further embodiment includes a prism fixed at a position deviated by a known first fixed length from the measurement point, an inclination casing for fixing an analysis pattern which is located at a position deviated by a known second fixed length from the prism in a same direction of the first fixed length and is located on a plane perpendicular to a line between the measurement point and a prism center of the prism, and a survey machine including a section of measuring a distance to the prism, a section of measuring an angle, and an image-taking section, wherein a three-dimensional position of the prism center is obtained in the distance measuring section and the angle measuring section, a pattern center of the analysis pattern is calculated by analyzing an image obtained by imaging the inclination casing, a positional direction of the inclination casing is calculated from the pattern center and the prism center on the image, a three-dimensional position of the pattern center is calculated which is deviated from the three-dimensional position of the prism center by the second fixed length in the positional direction of the inclination casing, and the three-dimensional position of the measurement point is measured by moving positional information from the three-dimensional position of the prism center in a direction along a line between the three-dimensional position of the pattern center and the three-dimensional position of the prism center by the first fixed length.

Effects of Invention

In accordance with the present invention, the three-dimensional position of the measurement point can be measured by placing the front end of the pointing rod on the measurement point even when the pointing rod is inclined.

BRIEF DESCRIPTION OF DRAWINGS

FIG. 5(a) shows a state in which the axial direction of the pointing rod is coincided with an eye direction, and FIG. 5(b) shows a state in which the axial direction of the pointing rod is deviated from the eye direction.

FIG. 6(a) is its basic flow chart, and FIG. 6(b) is its flow chart when an automatic chasing is conducted.

FIG. 20 (a) and FIG. 20 (b) Flow charts of measurement in the system for measuring the three-dimensional position of the second embodiment, FIG. 20(a) is its basic flow chart, and FIG. 20(b) is its flow chart when an automatic chasing is conducted.

EMBODIMENTS FOR IMPLEMENTING INVENTION

Preferred embodiments in accordance with the present invention will be described referring to the annexed drawings.
(Entire System)

Figure 1:
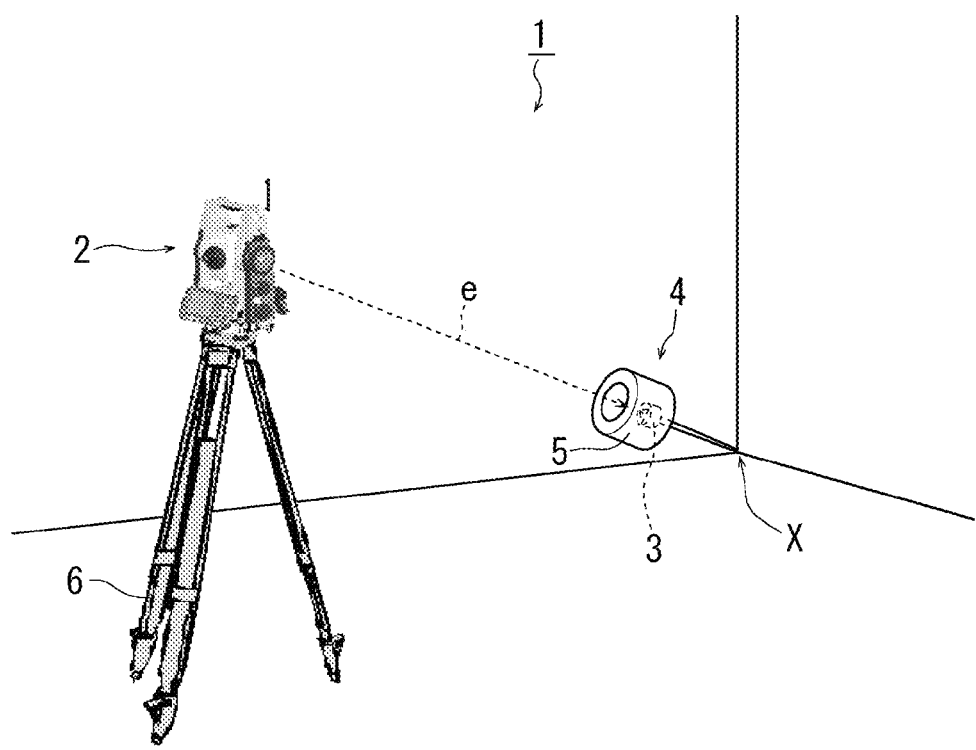
FIG. 1 A perspective view showing an entire configuration of a system for measuring a three-dimensional position in accordance with an embodiment of the present invention.

FIG. 1 is a perspective view showing an entire configuration of a system for measuring a three-dimensional position in accordance with a first embodiment of the present invention. The system 1 includes a survey machine 2, a prism 3, a pointing rod 4, and an inclination casing (module) 5. The front end of the pointing rod 4 is positioned at a measurement point X. The survey machine 2 is installed at a known position by using a tripod 6. An arrow "e" shows an eye direction of the survey machine 2.
(Survey Machine)

Figure 2:
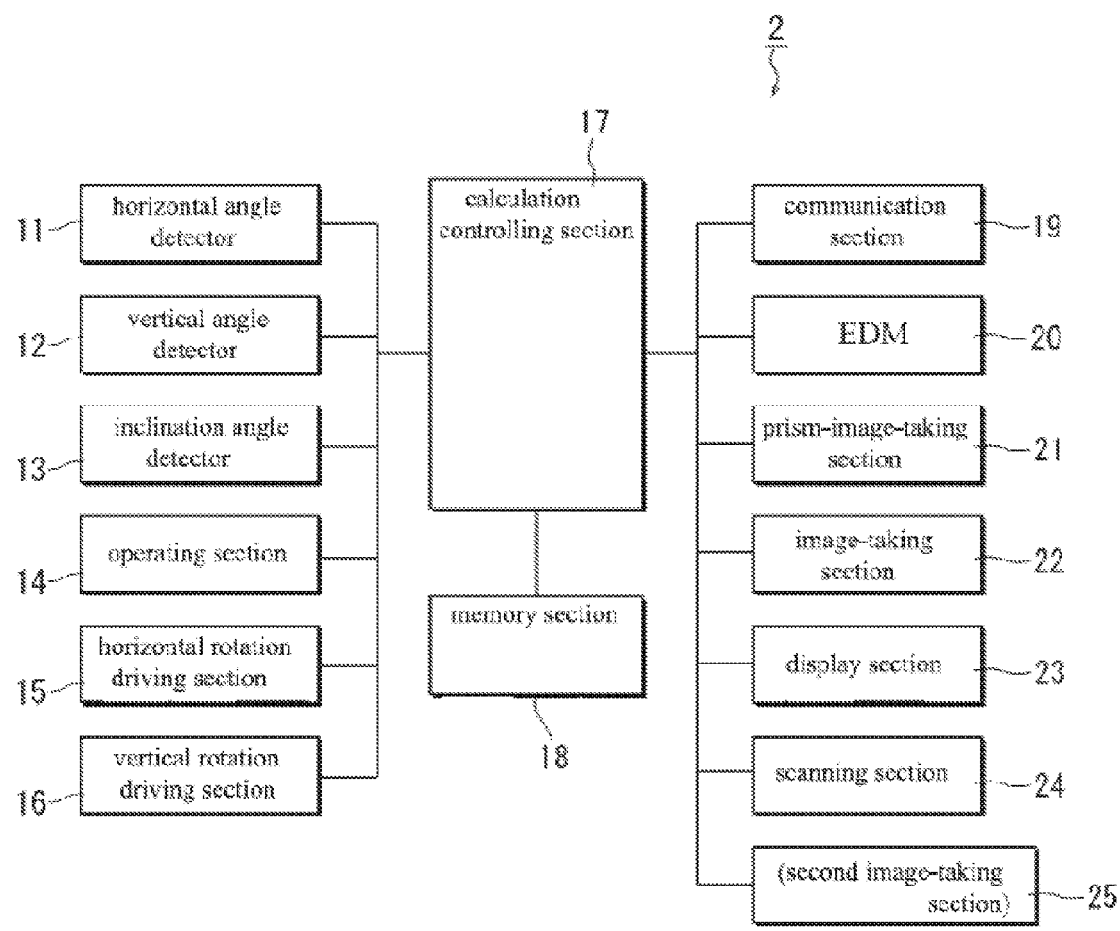
FIG. 2 A block diagram showing an internal configuration of a survey machine.

The survey machine 2 is a motor drive-total station in which the automatically chasing can be conducted. FIG. 2 is a block diagram showing the internal configuration of the survey machine.

The survey machine 2 includes a horizontal angle detector 11, a vertical angle detector 12, an inclination detector 13, an operating section 14, a horizontal rotation driving section 15, a vertical rotation driving section 16, a calculation controlling section 17, a memory section 18, a communication section 19, an electro-optical distance measuring instrument (EDM) 20, a prism image-taking section 21, an image-taking section 22, a display section 23, a scanning section 24 and a second image-taking section 25.

The EDM 20 is a section of measuring a distance to the prism 3 by collimating the prism 3 for outputting distance-measuring light such as infrared laser. The scanning section 24 scans for searching the prism 3 by outputting scanning light such as infrared laser of which a wavelength is different from that of the distance-measuring light. The horizontal rotation driving section 15 and the vertical rotation driving section 16 are motors for rotating the housing accommodating the EDM 20 in the horizontal and vertical directions, respectively. The horizontal angle detector 11 and the vertical angle detector 12 are rotary encoders, which are sections of measuring a horizontal angle and a vertical angle, respectively, of a standard optical axis by obtaining rotation angles in the horizontal direction and the vertical direction of the housing accommodating the EDM 20. The inclination sensor 13 is used to detect the inclination of the EDM 20 for leveling the inclination.

A memory section 18 stores various programs including a program of performing the measurements of the distance and the angle by controlling the EDM 20, a program of driving the horizontal and vertical rotation driving sections 15, 16 based on signals input from the operating section 14, a program of controlling communication, a program of conducting the automatic collimation and the automatic chasing of the prism 3, a program of image processing described later, and an operation program of calculating the three-dimensional position of the measurement point X described later. The operating section 14 can perform various operations required for the above programs. The calculation controlling section 17 executes the above programs for performing the various calculations and the various controls. The communication section 19 receives instruction signals from external radio equipment. When the external instructions are received, the calculation controlling section 17 rotates and drives the EDM 20 toward the measurement point, and further starts and stops the automatic chasing. The display section 23 displays various displays and various measurement values.

The prism image-taking section 21 and the image-taking section 22 are image sensors outputting image signals such as CCD and a CMOS sensor, and are configured by aggregates of pixels. The image-taking section 22 shoots a surrounding scene of the prism 3 (the scene including the prism 3). The prism image-taking section 21 is equipped with a filter passing only the wavelength of the scanning light, and is configured to appropriately shoot only the prism 3 by receiving the scanning light from the scanning section 24 reflected by the prism 3. A second image-taking section 25 is an arbitrary element and has a wider field of view than the image-taking section 22. The usage will be described later.

The above configuration is an example of the survey machine 2, and a modification can be made based on the knowledge of a skilled technician.
(Pointing Rod)

Figure 3:
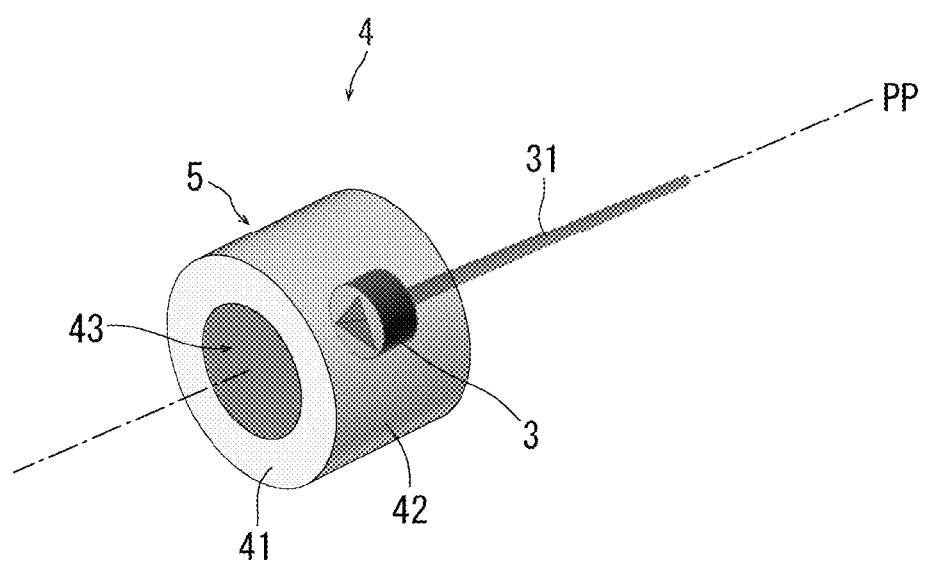
FIG. 3 A right-side perspective view showing a configuration of a pointing rod in accordance with the embodiment.
Figure 4:
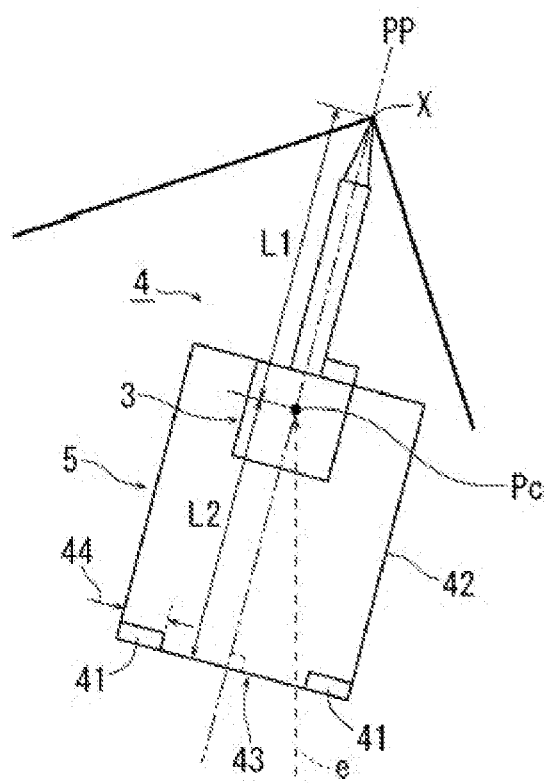
FIG. 4 A plan view showing a measuring state using the pointing rod.

FIG. 3 is a right-side perspective view showing a configuration of the pointing rod in accordance with the embodiment, and FIG. 4 is a plan view showing the measuring state using the pointing rod of FIG. 3. The pointing rod 4 includes a bar-shaped supporting element 31, the prism 3 and the inclination casing 5.

The front end of the supporting element 31 is ferrule-shaped, and is placed on the measurement point X during the measurement. A material of the supporting element 31 is not especially restricted, and that having moderate rigidity and lightweight property such as a metal is preferable. The prism 3 is fixed on the other end of the supporting element 31.

The prism 3 is fixed such that the center of the prism 3 (hereinafter referred to as "prism center Pc") is disposed in the axial direction PP of the pointing rod 4 (supporting element 31). The prism center Pc is a floating point in a precise sense. The floating point refers to a virtual point which appears to be immobile when the prism 3 is inclined with respect to the survey machine 2. A length from the prism center Pc to the front end (measurement point X) of the supporting element 31 is fixed as a known distance (this distance will be hereinafter referred to as "first fixed length L1"). In the present embodiment, any material which can output parallel reflection rays from input rays and can perform the image analysis of the target center can be employed as the prism 3 other than a cube corner prism, and a retroreflection sheet is also usable.

(Inclination Casing)

As shown in FIGS. 3 and 4, the inclination casing 5 includes an analysis pattern 41 and a casing 42 supporting the analysis pattern 41.

The analysis pattern 41 is fixed on a plane which is perpendicular to the axial direction PP of the pointing rod 4 and is deviated from the prism center Pc toward the front along the axial direction PP of the pointing rod 4 by a known distance (this distance will be hereinafter referred to as "second fixed length L2"). The measurement point X side is defined to be rear in the axial direction PP with respect to the front-rear direction. The analysis pattern 41 is shaped as a precise circle having a pattern width 44 in this embodiment.

Figure 10:
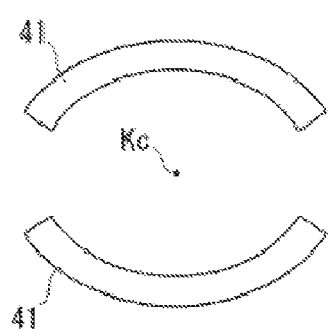
FIGS. 10(a), 10(b) and 10(c) Alternative examples of analysis patterns, respectively.
Figure 10:
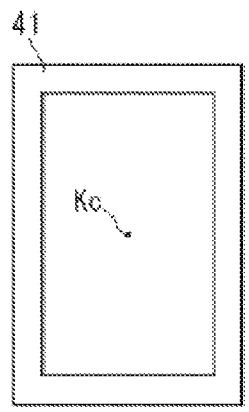
Figure 10:
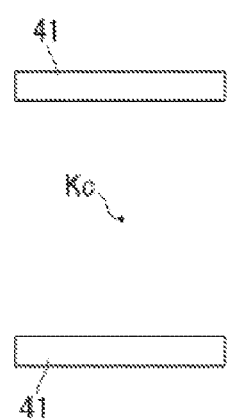

However, the analysis pattern 41 may be any shape provided that the center of the analysis pattern 41 (pattern center Kc described later) can be determined by means of the image analysis. An alternative example of the analysis pattern 41 will be described later (FIG. 10).

The casing 42 is a cylindrical hollow member having an opening 43 at its front end and the analysis pattern 41 on its front surface and stores the prism 3. The casing 42 is fixed to the supporting element 31.

However, the shape of the casing 42 does not need to have nearly the same as that of the analysis pattern 41, and the casing 42 may be formed by any material which can fix the analysis pattern 41 on the front or the behind of the prism 3.

The analysis pattern 41 formed on the front surface of the casing 42 which defines the opening 43 is not necessarily formed with a material the same as that of the casing 42, and is preferably colored with coloration having a larger contrast in the image processing such as black and white which may be formed by printing and adhesion. The analysis pattern 41 may also be formed on the external or internal circumference. The prism 3 and the inclination casing 5 may be fixed by a suitable means such as adhesive bonding, screw cramping, concave-convex engagement and welding.

Figure 5:
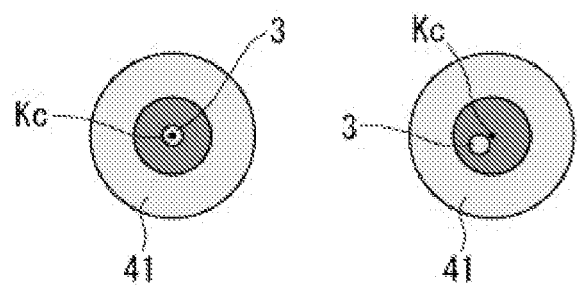
FIG. 5(a) and FIG. 5(b) Drawings of the pointing rod viewed from the survey machine.

FIG. 5 is drawings of the pointing rod 4 viewed from the survey machine 2, FIG. 5(*a*) shows a state in which the axial direction PP of the pointing rod 4 is coincided with an eye direction "e", and FIG. 5(*b*) shows a state in which the axial direction PP of the pointing rod 4 is deviated from the eye direction "e".

When the eye direction "e" of the survey machine 2 is coincident with the axial direction PP of the pointing rod 4, the prism 3 is viewed on the pattern center Kc of the pattern 41 as shown in FIG. 5(*a*). On the other hand, when the eye direction "e" is not coincident with the axial direction PP of the pointing rod 4, the prism 3 not positioned on the pattern center Kc of the pattern 41 is viewed in an opposite direction to the movement of the eye direction, as shown in FIG. 5(*b*).

In the inclination casing 5, the position of the prism 3 (prism center Pc) changes with respect to the pattern center Kc depending on the inclination angle with respect to the eye direction "e". Accordingly, the positional direction of the inclination casing 5 with respect to the eye direction "e" can be found by shooting the pattern 41 followed by its image analysis. Then, when it becomes apparent how far the pattern 41 is deviated from the prism center Pc (second fixed length L2), the inclination direction of the pointing rod 4 can be analyzed. More in detail, the three-dimensional position of the measurement point X can be measured in accordance with the following method.

(Measurement Method)

Figure 6:
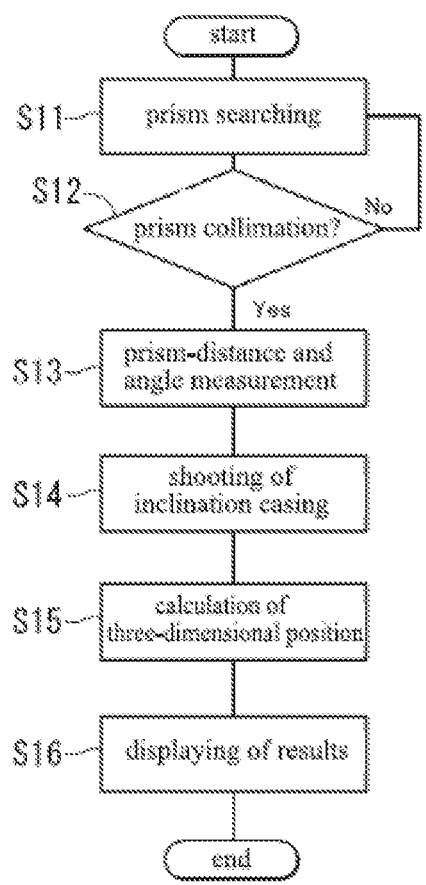
FIG. 6 (a) and FIG. 6(b) Flow charts of measurement in the system for measuring the three-dimensional position of the embodiment.
Figure 6:
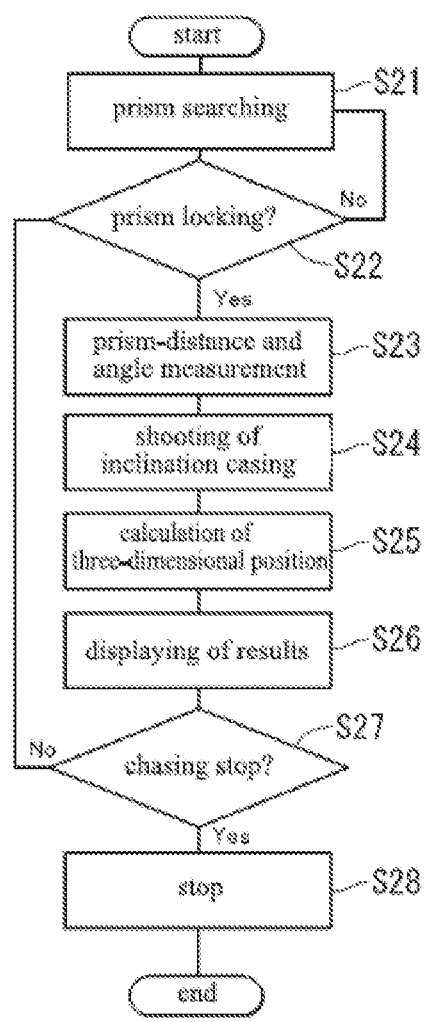

At first, the outline of the measurement will be described. FIG. 6 is flow charts of measurement in the system for measuring the three-dimensional position 1, FIG. 6(*a*) is its basic flow chart, and FIG. 6(*b*) is its flow chart when an automatic chasing is conducted.

As shown in FIG. 6(*a*), basically, the prism 3 is scanned for searching at a scanning section 24 at a step S11. Then, whether the automatic collimation of the prism 3 is performed or not is judged based on the image in which only the prism 3 is shot by using the prism image-taking section 21 at a step S12. When the automatic collimation is not performed, the processing returns to the step S11. When the automatic collimation is performed, the processing is shifted to a step S13, and the distance and the angle to the prism 3 are measured for determining the three-dimensional position of the prism 3. Then, the processing is shifted to a step S14 for shooting the inclination casing 5 by using the image-taking section 22. The step S13 and the step S14 may be implemented simultaneously. Then, the processing is shifted to a step S15 for calculating the three-dimensional position of the measurement point X. Then, the processing is shifted to a step S16 for displaying the measurement point X on the display section 23, and the processing is ended.

For conducting the automatic chasing, as shown in FIG. 6(*b*), the prism 3 is scanned for searching at a step S21, and whether the prism 3 is locked (collimated) or not is judged based on the image in which only the prism 3 is shot by using the prism image-taking section 21 at a step S22. Subsequent steps S23 to S26 are similar to the steps S13 to S16. When the stop of the automatic chasing is ordered at a step S27, the processing advances to a step S28 for stopping the chasing. In absence of the stop order, the processing returns to the step S22 for continuing the chasing.

(Calculation Method of Three-Dimensional Position)

Figure 7:
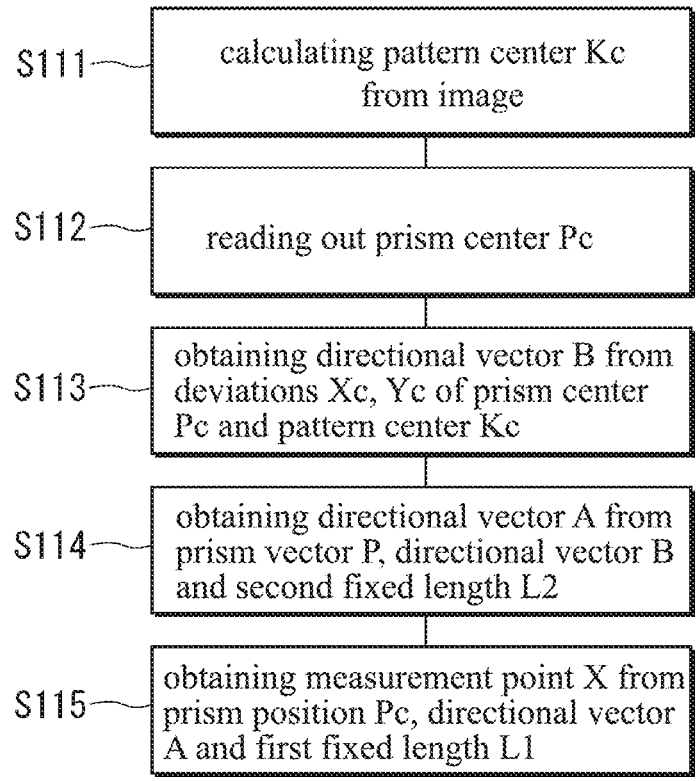
FIG. 7 A flow chart for calculating the three-dimensional position.
Figure 8:
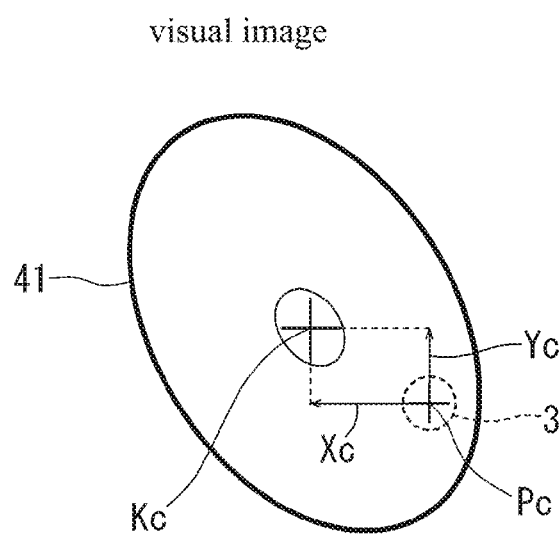
FIG. 8 An example of a visual image.
Figure 9:
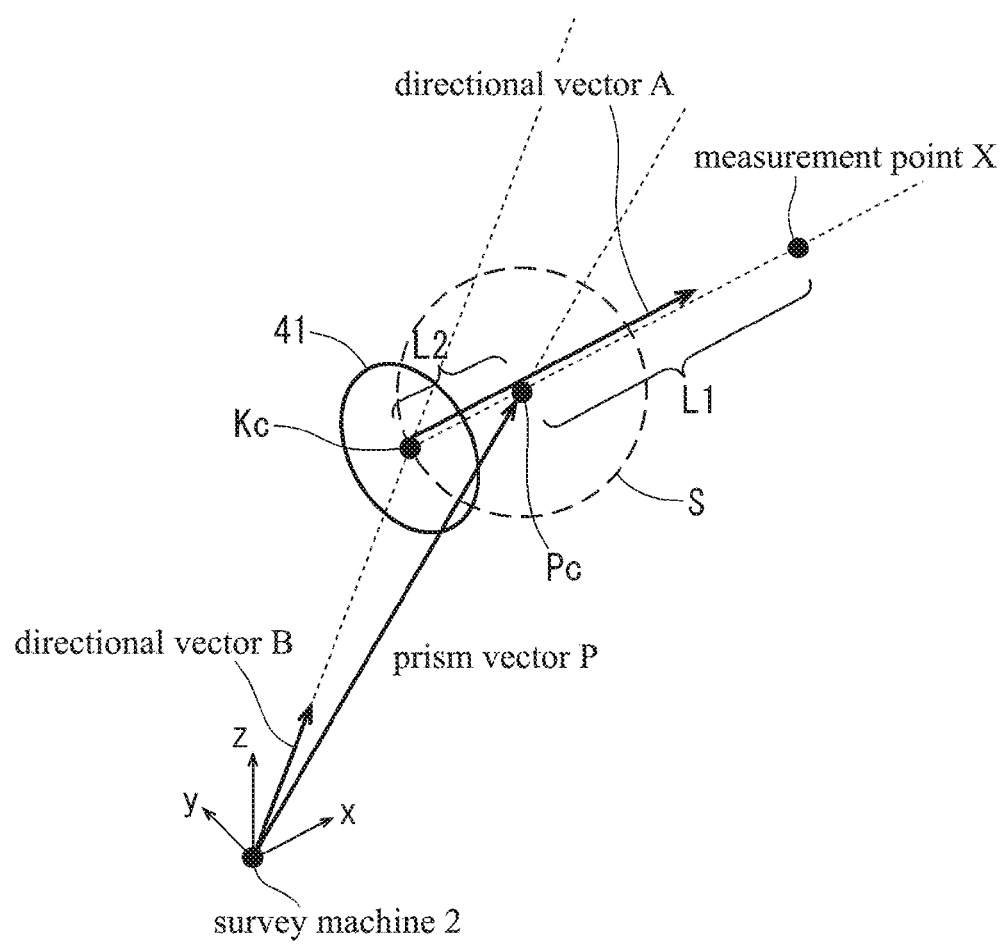
FIG. 9 A conceptional drawing of the measurement method.

A method of calculating the three-dimensional position of the measurement point X at the step S15 or the step S25 of FIG. 6 in the present embodiment will be described. FIG. 7 is a flow chart for calculating the three-dimensional position. FIGS. 8 and 9 are drawings for supplementing the description of the flow chart of FIG. 7, FIG. 8 is an example of a visual image, and FIG. 9 is a conceptional drawing of the measurement method.

At first, at a step S111, the pattern center Kc of the analysis pattern 41 is image-analyzed by using a visual image shot at the image-taking section 22 (refer to FIG. 8).

Then, the value of the measured distance of the prism 3 obtained at the EDM 20 and the value of the measured angle of the prism 3 obtained at the horizontal angle detector 11 and the vertical angle detector 12 are read out from the memory section 18 at a step S112.

Then, at a step S113, a horizontal direction-deviation value Xc and a vertical direction-deviation value Yc between the positions of the prism center Pc and the pattern center Kc on the image is determined (refer to FIG. 8). The prism 3 does not frequently appear on the image-taking section 22 though the prism 3 is shot at the prism image-taking section 21. However, the three-dimensional position of the prism center Pc is apparently distinguished so that the prism center Pc may be registered in advance at the memory section 18 where it is positioned on the visual image of the image-taking section 22 when the prism 3 is collimated. The positional direction (directional vector B) of the inclination casing 5 (pattern center Kc) is determined from the deviation values Xc and Yc (refer to FIG. 9). The directional vector has only information of direction without dimension.

Then, at a step S114, a sphere S having a radius of the second fixed length L2 centering around the prism center Pc is figured out for determining the intersection between the sphere S and the directional vector B. The positional information of this intersection is the three-dimensional position of the pattern center Kc. Then, A line (directional vector A) through the pattern center Kc (three-dimensional position) and the prism center Pc (three-dimensional position) is determined (refer to FIG. 9). The directional vector A is an inclination direction of the pointing rod 4.

Then, at a step S115, the three-dimensional position of the measurement point X is determined by the moving the positional information on the position of the prism center Pc by the first fixed length L1 in the direction of the directional vector A.

(Effects)

In the above three-dimensional position measuring system 1 in accordance with the present embodiment, since the analysis pattern 41 is deviated away from the prism 3 (prism center Pc) by the known amount (second fixed length L2) in the axial direction PP by means of the inclination casing 5, the line between the pattern center Kc and the prism center Pc (directional vector A) is coincident with the axial direction PP of the pointing rod 4. For this reason, the measurement point X can be measured by moving the positional information from the prism vector P at the prism center Pc by the first fixed length L1 in the direction of the directional vector A (refer to FIG. 9).

The steps S11 to S13 or the steps S21 to S23 of the present embodiment can be performed if the collimation is conducted by using the image obtained in the image-taking section 22. In this case, the collimation can be performed by using an image shot with illumination rays of a continuous spectrum, and not by a specified wavelength of the scanning section 24.

However, the collimation is conducted by using the image in which only the prism 3 is shot and is obtained at the scanning section 24 and the prism image-taking section 21 at the steps S11 to S13 or the steps S21 to S23 after the prism image-taking section 21 is installed separated from the image-taking section 22. Thereby, the automatic collimation can be conducted more definitely and the position of the prism 3 can be analyzed more precisely so that the three-dimensional position of the prism center Pc in the above step S115 can be preferably obtained with higher accuracy.

In accordance with the present embodiment, A worker can measure the three-dimensional position of the measurement point X without adjustment such as leveling of the prism 3 even if the pointing rod 4 is inclined only by contacting the front end of the pointing rod 4 at the measurement point X so that the operation efficiency is elevated. As shown in FIG. 5(b), the combination with the automatic chasing enables the successive measurements only by contacting the pointing rods 4 to the points one after another which are to be measured because the measured values of the distance and the angle of the prism and the pattern center Kc are calculated on a real-time basis for renewing the position of the measurement point X so as to further elevate the operation efficiency.

No further sensor is required for measuring the inclination of the pointing rod 4 so that the inexpensive operation can be achieved. The higher accuracy can be obtained than the use of a sensor value because the measurement point X is calculated from the analysis value of the analysis pattern 41 based on the prism position which can be obtained with higher accuracy.

The three-dimensional position measuring system 1 can be installed by changing the position on which the prism 3 is disposed with respect to a conventional pointing rod and by adding the inclination casing 5. The inclination casing 5 is significantly inexpensive because it is easily formed by the analysis pattern 41 and the casing 42 supporting the pattern 41

The sensitivity design of the inclination angle can be easily conducted in the three-dimensional position measuring system 1 of the present embodiment. The moving amount of the prism 3 on the image with respect to the inclination angle from the eye direction "e" can be seemingly magnified when the distance of the second fixed length L2 is increased. That is, the sensitivity design of the inclination angle can be easily performed only by changing the length of the inclination casing 5 (second fixed length L2). For this reason, it is also preferable that the inclination casings 5 for measuring a long distance, a middle distance and a short distance are prepared which may be replaced among one another depending on a usage.

When the inclination angle from the eye direction "e" is excessively larger, the probability that an error is generated in the image analysis may be increased. Since, however, the excessive inclination angle disables the collimation of the prism 3 due to the casing 42 in the three-dimensional position measuring system 1 of the present embodiment, the steps after the step S12 or the step S22 in FIG. 6 are not operated so that the measurement is stopped to prevent the erroneous measurement.

Alternative Examples

FIGS. 10 to 13 show alternative examples of the present embodiment.

FIG. 10 shows an alternative example of the analysis pattern 41. The analysis pattern shown in FIG. 10(a) lacks a part of the ellipse-shaped analysis pattern 41. Also in this case, the pattern center Kc can be obtained as the center of parallel lines. The analysis pattern shown in FIG. 10(b) is rectangular. Also in this case, the pattern center Kc can be obtained as the intersection between diagonal lines. The analysis pattern shown in FIG. 10(c) is formed by two parallel lines. Also in this case, the pattern center Kc can be obtained as the intersection between diagonal lines and as the center of a perpendicular bisector.

Figure 11:
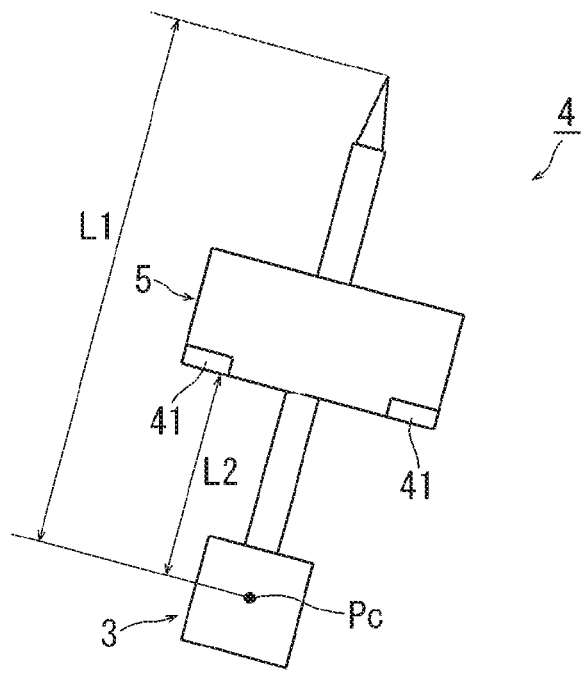
FIG. 11 An alternative example of an inclination casing (module).

FIG. 11 shows an alternative example regarding the position of the inclination casing 5. In this example, the inclination casing 5 is formed behind the prism 3. In this example, the analysis pattern 41 is fixed to a position which is on a place perpendicular to the axial direction PP of the pointing rod 4 and is deviated away from the prism center Pc in the axial and rear direction PP of the pointing rod 4 by the known distance (second fixed length L2). Also in this configuration, the measurement point X can be measured by using the method shown in FIG. 7.

Figure 12:
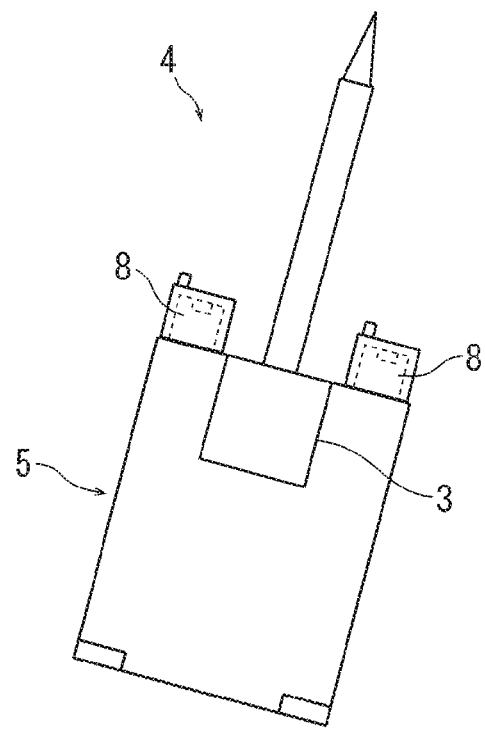
FIG. 12 A further alternative example of the inclination casing.

FIG. 12 shows an alternative example of the inclination casing 5 of FIG. 3 in which an illumination device 8 is equipped on the rear surface of the casing 5. While the illumination device 8 may include any configuration, the device 8 may be configured by, for example, accommodating an LED chip and an electronic substrate in a housing such that the device 8 may be turned ON and OFF by means of an external switch depending on necessity, as shown in FIG. 12. The illumination device 8 equipped on the rear surface of the casing 5 enables the shooting of the analysis pattern 41 even at a dark place so that it is advantageous for the night-time measurement.

Figure 13:
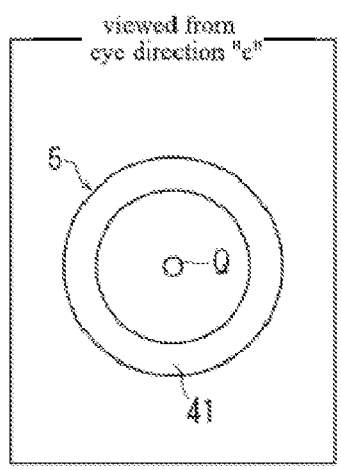
FIGS. 13(a) and 13(b) Alternative example of the inclination casing as seen by eye direction "e" and in plan.
Figure 13:
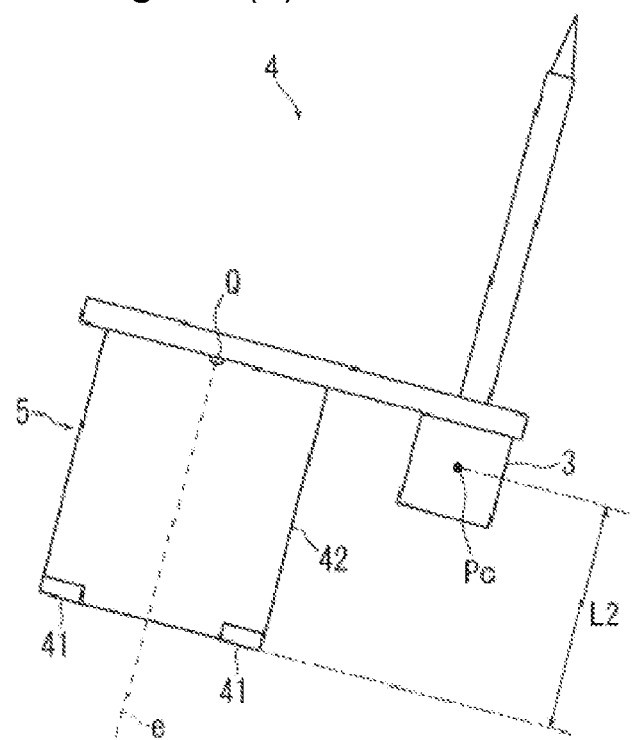

FIG. 13 shows a further alternative example of the position of the inclination casing 5. In this example, the inclination casing 5 is formed not on the axial direction PP of the pointing rod 4 but around the prism 3. The analysis pattern 41 exists on a plane perpendicular to the axial direction PP of the pointing rod 4, and does not need to be on the axial direction PP of the pointing rod 4 provided that the pattern 41 is present on a position which is deviated by the second fixed length L2 in the axial direction PP of the pointing rod 4. In this configuration, the formation of a mark Q which can be shot by the image-taking section 22 is required at the central position of the analysis pattern 41 in the casing 42. The mark Q is preferably made of a material having a large amount of contrast such as a black and white pattern.

In this embodiment, the casing 42 may be made of a translucent material such that the mark Q may be readily imaged. The whole periphery of the mark Q is more preferably made of a translucent material to which another shadow is hardly projected during the imaging rather than of a transparent material or a material having a hole for daylight, and acryl resin is suitable, for example.

Figure 14:
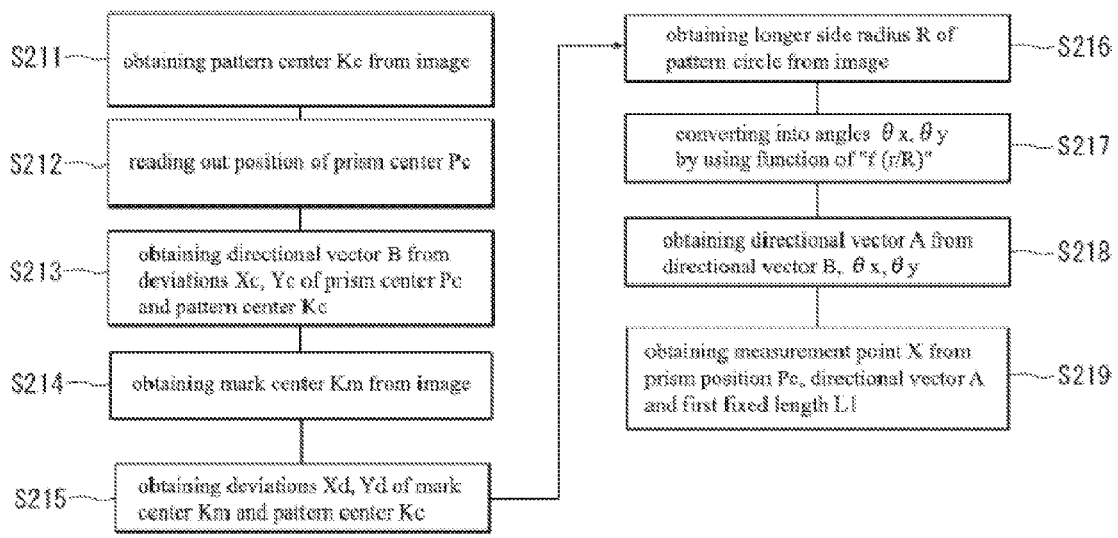
FIG. 14 A flow chart of calculating the three-dimensional position in the still further alternative example of FIG. 13.
Figure 15:
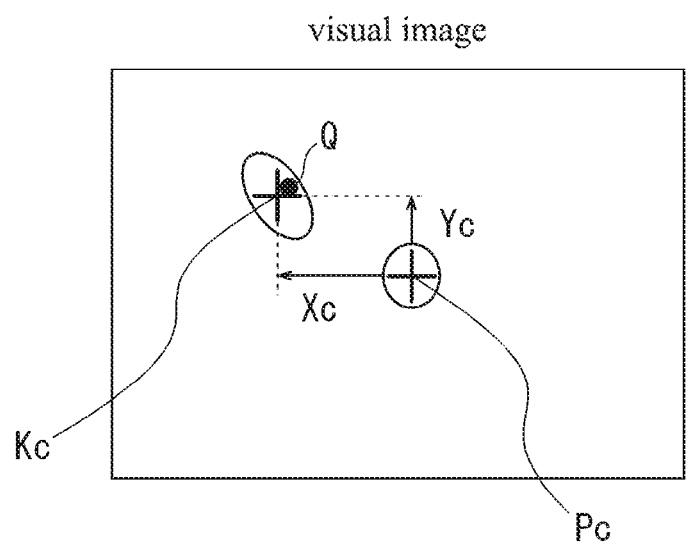
FIG. 15 An example of a further visual image.
Figure 16:
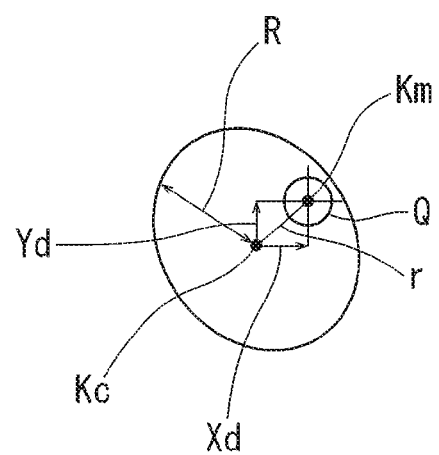
FIG. 16 An example of a still further visual image.
Figure 17:
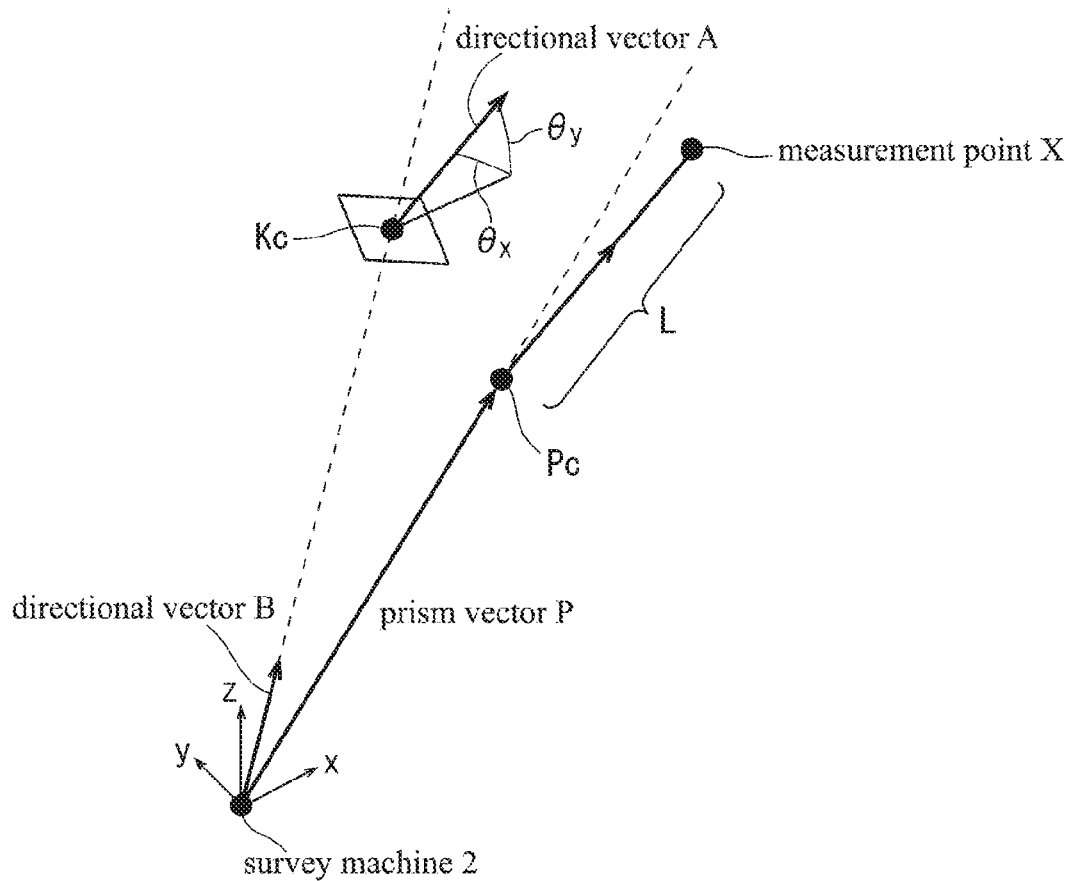
FIG. 17 A conceptional drawing of the measurement method shown in the alternative example in FIG. 13.

In the embodiment shown in FIG. 13 in which the analysis pattern 41 does not exist on the axial direction PP of the pointing rod 4, the measurement point X can be measured by using the following method. FIG. 14 is a flow chart of calculating the three-dimensional position. FIGS. 15 to 17 supplement the description of the flow chart of FIG. 14, and FIGS. 15 and 16 are examples of visual images, and FIG. 17 is a conceptional diagram of a calculation method.

At first, at a step S211, the pattern center Kc of the analysis pattern 41 is analyzed from the visual image shot in the image-taking section 22 (refer to FIG. 15).

Then, at a step S212, the three-dimensional position of the prism 3 (measured values of distance and angle of the prism center Pc) obtained by the EDM 20 is read out from the memory section 18.

Then, at a step S213, the horizontal direction-deviation value Xc and the vertical direction-deviation value Yc between the positions of the prism center Pc and the pattern center Kc on the image are obtained (refer to FIG. 15), and the positional direction of the inclination casing 5 (directional vector B) is obtained from the deviation values Xc and Yc (refer to FIG. 17).

Then, at a step S214, the image of the mark center Kn of the mark Q is analyzed from the visual image shot in the image-taking section 22 (refer to FIG. 16).

Then, at a step S215, a horizontal direction-deviation value Xd and a vertical direction-deviation value Yd between positions of a mark center Km and the pattern center Kc on the image are obtained, and a mark radius "r" from the pattern center Kc to the mark center Km is obtained (refer to FIG. 16).

Then, at a step S216, the longer side radius R of the analysis pattern 41 is analyzed on the image (refer to FIG. 16).

Then, at a step S217, a horizontal direction-inclination angle θx and a vertical direction-inclination angle θy of the inclination casing 5 viewed from the eye direction "e" of the survey machine 2 are obtained by using a function of "f(r/R)=θ" (refer to FIG. 17). Since the position of the mark Q with respect to the analysis pattern 41 changes depending on the inclination angle of the eye direction in the inclination casing 5, the change of the inclination angle with the eye direction can be related with the mark radius "r" from the pattern center Kc to the mark center Km using a function. One example of the function appears in JP-A-2014-102246.

Then, at a step S218, a normal line direction of the inclination casing 5 viewed from the eye direction of the survey machine 2 (directional vector A) is obtained from the directional vector B, the inclination angles θx and θy (refer to FIG. 17). The directional vector A is the inclination direction of the pointing rod 4.

Then, at a step S219, the three-dimensional position of the measurement point X is obtained by moving the positional information from the three-dimensional position of the prism center Pc in the direction of the directional vector A by the first fixed length L1.

In this alternative example, the analysis pattern 41 of the inclination casing 5 is formed on the plane perpendicular to the axial direction PP of the pointing rod 4 so that the directional vector A obtained by the analysis of the inclination casing 5 is coincident with the axial direction PP of the pointing rod 4. For this reason, the measurement point X can be measured by moving the positional information from the prism vector P at the prism center Pc by the first fixed length L1 in the direction of the directional vector A (refer to FIG. 17).

Also in this alternative example similarly to the above examples, the three-dimensional position of the measurement point X can be measured, even if the pointing rod 4 is inclined, only by contacting the front end of the pointing rod 4 at the measurement point X. No further sensor is required for measuring the inclination of the pointing rod 4 so that the inexpensive operation can be achieved. The three-dimensional position measuring system 1 can be installed by changing the position on which the prism 3 is disposed with respect to a conventional pointing rod and by adding the inclination casing 5, can be easily formed, and is significantly inexpensive. The sensitivity design of the inclination angle can be easily achieved by the adjustment of the length of the casing 42 (second fixed length L2). In this embodiment, the prism 3 is replaceable with another prism having a different dimension not affected by the size of the inclination casing 5.

Second Embodiment

Entire System

The second embodiment is different from the above embodiment in that the prism 3 is not an indispensable element.

(Pointing Rod)

Figure 18A:
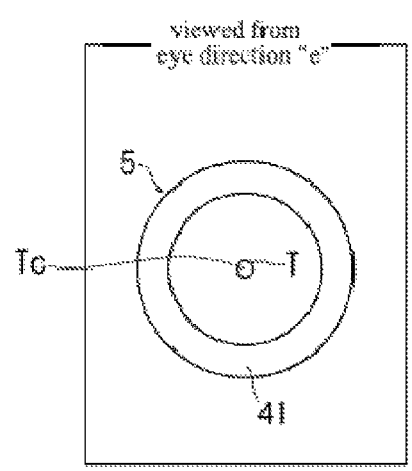
FIG. 18(a) and FIG. 18(b) A configuration of a pointing rod of a second embodiment of the present invention as seen by eye direction "e" and in plan.
Figure 18B:
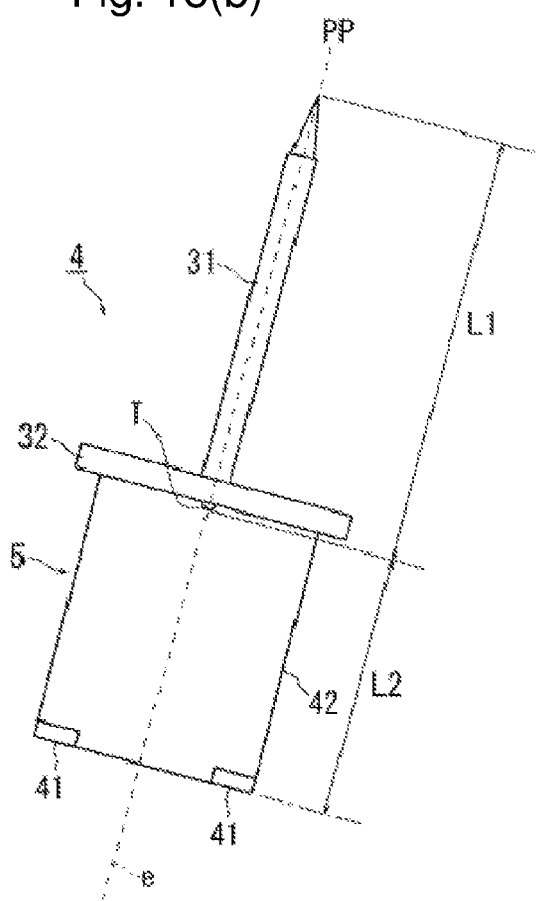

FIG. 18 is a right-side perspective view showing the configuration of a pointing rod 4 of the second embodiment. The pointing rod 4 includes a bar-shaped supporting element 31 and an inclination casing 5. The front end of the supporting member 31 is placed on the measurement point X similarly to the above embodiment.

A mark T of which an image can be taken by the image-taking section 22 is formed in place of the prism 3 at the original position of the prism 3 at the other end of the supporting member 31. That is, the mark T is fixed at a position deviated from the measurement point X by the first fixed length L1. The mark T may be formed on any supporting body such as a board 32 fixed perpendicular to the supporting member 31. Also in this embodiment, the mark T is preferably made of a material having a large amount of contrast such as a black and white pattern.

The inclination casing 5 is formed so as to accommodate the mark T therein. The analysis pattern 41 is fixed, by the casing, on a position which is present on a plane perpendicular to the axial direction PP of the pointing rod 4 and is deviated from the mark T toward the front direction in the axial direction PP of the pointing rod 4 by the second fixed length L2. The casing 42 may be fixed and supported by the board 32. That is, in the second embodiment, the mark T is collimated as a target, and the three-dimensional position of the measurement point X is measured by measuring the distance to the mark T by using non-prism measurement.
(Survey Machine)

Figure 19:
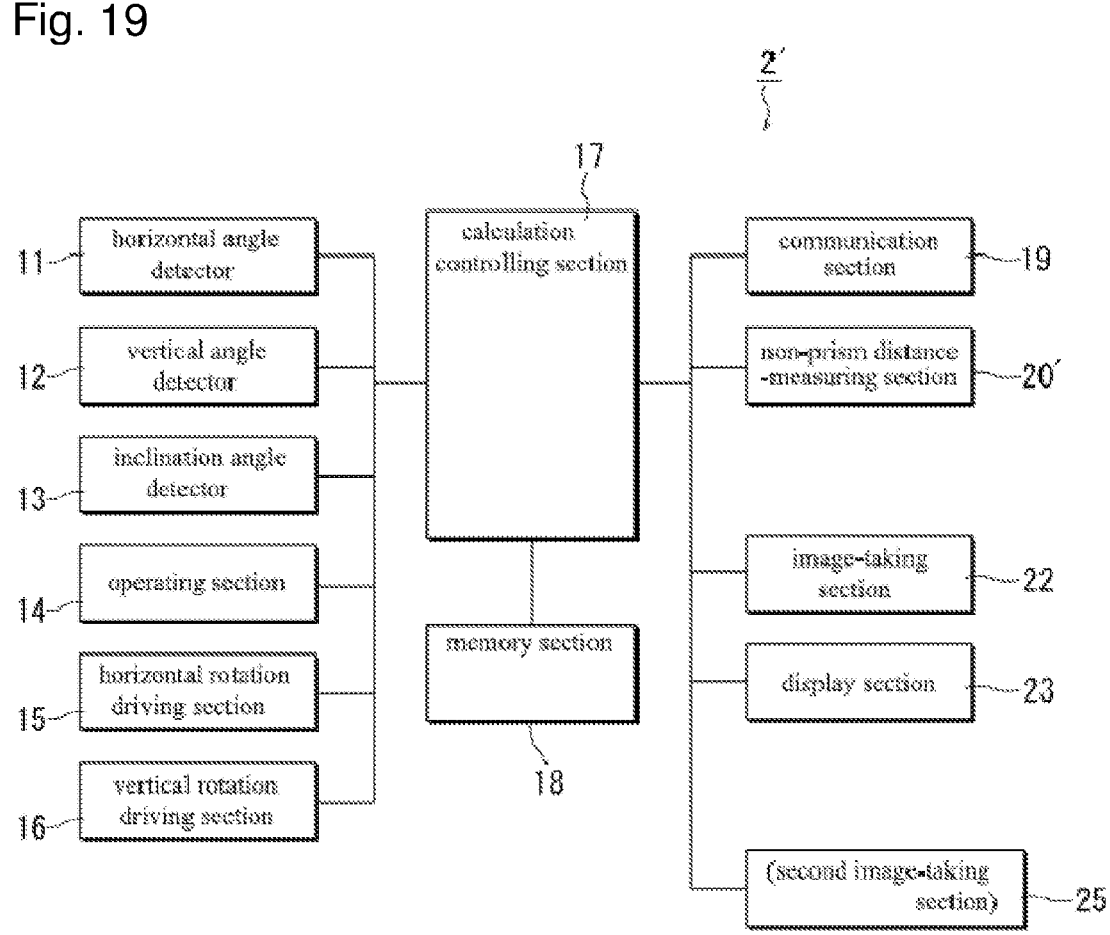
FIG. 19 A block diagram showing an internal configuration of a survey machine of the second embodiment.

FIG. 19 is a block diagram showing the internal configuration of a survey machine 2' of the second embodiment. The present embodiment can be conducted by employing not only the survey machine 2 used in the above embodiment but also the following survey machine 2' provided that the image-taking sections 22 can provide the high sensitivities. The EDM 20, the prism image-taking section 21 and the scanning section 24 which are mounted for collimating (chasing) the prism 3 are not indispensable in the survey machine 2' of FIG. 19, and a non-prism distance-measuring section 20' is necessary which measures a distance to a target other than the prism by outputting distance-measuring rays such as laser rays with fine beams. In the present embodiment, the target is the mark T, and the collimation (chasing) to the mark T is performed in accordance with a known image processing such as a pattern matching by the imaging at the image-taking section 22.
(Measurement Method)

The summary of the measurement in accordance with the second embodiment will be described. FIG. 20 is flow charts of measurement in the system for measuring the three-dimensional position of the second embodiment, FIG. 20(a) is its basic flow chart, and FIG. 20(b) is its flow chart when an automatic chasing is conducted. Basically, as shown in FIG. 20(a), the inclination casing 5 is shot at the image-taking section 22 at a step S31. Then, at a step S32, the image of the mark T is analyzed by using the image shot at the image-taking section 22, and it is judged whether or not the target is automatically collimated. When the collimation is not completed, the process is returned to the step S31. On the other hand, when the collimation is completed, the process is shifted to the step S33, and the distance and the angle of the marks are measured for determining the three-dimensional position of the mark T. Then, the process is shifted to a step S34 for calculating the three-dimensional position of the measurement point X. Then, the process is shifted to a step S35 for displaying the measurement point X on the display section 23, and is terminated. In case of the automatic chasing, as shown in FIG. 20(b), the inclination casing 5 is shot at the image-taking section 22 at a step S41. Then, at a step S42, it is judged whether or not the mark T acting as the target is locked (automatically collimated). When it is locked, the distance and the angle of the mark T are measured after the process is shifted to a step S43. Other steps S44 to S47 are the same as the steps S25 to S28.
(Calculation Method of Three-Dimensional Position)

The method of measuring the three-dimensional position of the measurement point X at the step S34 or the step S44 shown in FIG. 20 can be conducted similarly to "the method of measuring the three-dimensional position" of the above embodiment by replacing "the prism 3" with "the mark T", and replacing the "the prism center Pc" with "the mark center Tc of the mark T" (refer to the flow chart of FIG. 7).
(Effects)

As described, in the second embodiment, the three-dimensional position of the measurement point X can be measured without the prism 3 similarly to the above embodiment by replacing the process of measuring the prism distance by means of collimating (chasing) the prism 3 in the above embodiment with the process of non-prism measurement by means of collimating (chasing) the mark T of the inclination casing 5.

Alternative Example

Also in the second embodiment, the analysis pattern 41 may be deformed after FIG. 10. In the present embodiment, a bar code such as QR code (registered trademark) of which color is different from that of the mark Q of the inclination casing 5 is suitably attached because the collimation of the mark T is suitably conducted. The analysis pattern 41 may be fixed to the position which is deviated on the plane perpendicular to the axial direction PP of the pointing rod 4 by the second fixed length L2 from the mark T in the rear direction, after FIG. 11. The illumination device 8 may be equipped on the rear surface of the inclination casing 5 after FIG. 12. The position of the inclination casing 5 may be offset to a position around the mark T after FIG. 13. Also in this case, for a bar code such as QR code (registered trademark) of which color is different from that of the mark Q of the inclination casing 5 is suitably attached for the easy collimation of the mark T.

Third Embodiment

Entire System

Figure 21:
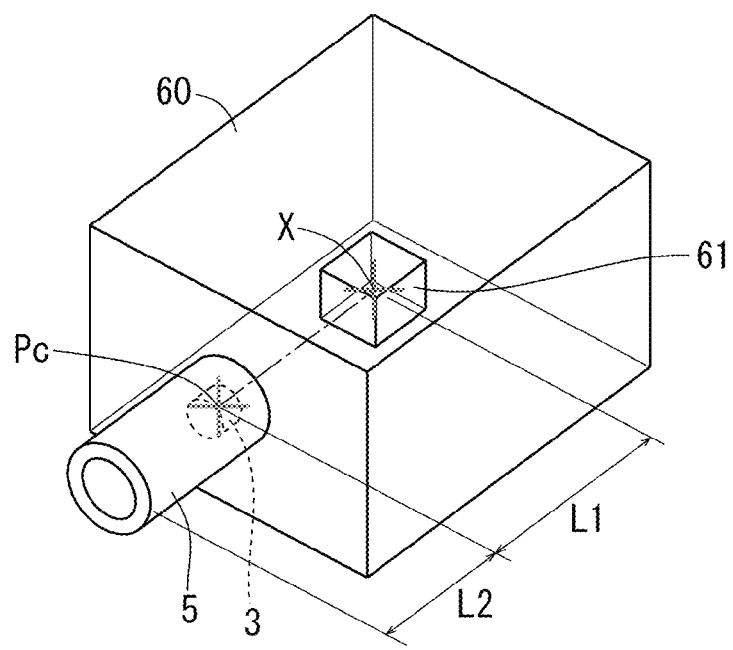
FIG. 21 A right-side perspective view showing a configuration of a third embodiment of the present invention

A third embodiment is different from the above embodiments in that the bar (supporting member 31) is not an indispensable element. FIG. 21 is a right-side perspective view showing the configuration of the third embodiment. The survey machine 2 may be the same as that of FIG. 2, and the prism 3 is suitably imaged at the prism image-taking section 21. The third embodiment does not include the supporting member 31 and includes the prism 3 and an inclination casing 5.
(Effects)

The three-dimensional position of the measurement position X can be measured similarly to the flow chart of FIG. 7, even without the supporting member 31, by disposing the prism 3 (prism center Pc) on the position offset from the measurement position X by the first fixed length L1, placing the analysis pattern 41 of the inclination casing 5 on a plane perpendicular to the line between the measurement point X, and the prism center Pc so that the pattern is disposed on the position offset from the prism center Pc by the second fixed length L2 in the same direction of the first fixed length L1. This embodiment is effective for a device in which a certain sensor 61 is equipped in a housing 60 when the prism 3 cannot be placed near the sensor 61 due to the housing 60. The first fixed length L1 can be determined by utilizing a mechanical drawing of the device. In the third embodiment, the three-dimensional position of the measurement point X can be measured even when a configuration is employed in which a distance to the mark T is measured with non-prism measurement in place of employing the prism 3 after the second embodiment.

In order to prevent the non-appearance of the prism 3 and the analysis pattern 41 in the view of the image-taking section 22 at the time of the short-range measurement, the second image-taking section 25 having a wider field of view may be equipped on the survey machine 2 in a further alternative other than the above embodiments and the alternative examples. A marking pen at the front end of the supporting member 31 of the pointing rod 4 can leave a measurement locus on a job site at the time of the working. The information such as velocity drawn at the calculation controlling section 17 can be obtained because the data of the drawn locus (measurement point X) is registered in real time. The length of the pointing rod 4 may be freely stretched provided that the first fixed length L1 and/or the second fixed length L2 can be precisely determined and the position is determined.

While the embodiments and the alternative examples of the system for measuring the three-dimensional position in accordance with the present invention have been described, these are examples of the present invention, and the respective embodiments and alternative examples can be combined based on the knowledge of a skilled technician. The combined embodiments are included in the scope of the present invention.

DESCRIPTION OF SYMBOLS 1 system for measuring three-dimensional position
2 survey machine
3 prism
4 pointing rod
5 inclination casing
11 detector of horizontal angle (angle-measuring section)
12 detector of vertical angle (angle-measuring section)
17 calculation controlling section
20 EDM (distance-measuring section)
21 prism image-taking section
22 image-taking section
41 analysis pattern
44 pattern width
Kc pattern center
Pc prism center
L1 first fixed length
L2 second fixed length

The invention claimed is:

1. A system of measuring a three-dimensional position of a measurement point,
the system comprising:
a pointing rod positioned on the measurement point;
a prism fixed at a position deviated by a known first fixed length from the measurement point in an axial direction of the pointing rod;
an inclination casing for fixing an analysis pattern which is located at a position deviated by a known second fixed length from the prism in the axial direction of the pointing rod and is located on a plane perpendicular to the axial direction of the pointing rod; and
a survey machine including a section of measuring a distance to the prism, a section of measuring an angle, and an image-taking section,
the three-dimensional position of the measurement point being measured from a three-dimensional position of the prism obtained in the sections of measuring the distance and the angle, an inclination direction of the pointing rod obtained from an image obtained by imaging the inclination casing by means of the image-taking section, and the first fixed length.

2. The system of measuring the three-dimensional position of the measurement point as claimed in claim 1,
wherein the system includes:
obtaining a three-dimensional position of a prism center of the prism in the sections of measuring the distance and the angle,
calculating a pattern center of the analysis pattern by analyzing the image obtained by means of imaging the inclination casing;
calculating a positional direction of the inclination casing from the pattern center and the prism center on the image;
calculating the three-dimensional position of the pattern center to which a distance from the three-dimensional position of the prism center on the positional direction of the inclination casing is the second fixed length; and
measuring the three-dimensional position of the measurement point by moving positional information from the three-dimensional position of the prism center in a direction along a line between three-dimensional position of the pattern center and the three-dimensional position of the prism center by the first fixed length.

3. The pointing rod used in the system of measuring the three-dimensional position of the measurement point as claimed in claim 1,
wherein the prism is fixed to the position deviated by the known first fixed length from the measurement point in the axial direction of the pointing rod, and
the inclination casing fixes the analysis pattern which is located at the position deviated by the known second fixed length from the prism in the axial direction of the pointing rod and is located on the plane perpendicular to the axial direction of the pointing rod.

4. A system of measuring a three-dimensional position of a measurement point,
the system comprising:
a pointing rod positioned on the measurement point;
a prism fixed at a position deviated by a known first fixed length from the measurement point in an axial direction of the pointing rod;
an inclination casing for fixing an analysis pattern which is located at a position deviated by a known second fixed length from the prism in the axial direction of the pointing rod and is located on a plane perpendicular to the axial direction of the pointing rod; and
a survey machine including a section of measuring a distance to the prism, a section of measuring an angle, an image-taking section of shooting a surrounding scene, and a prism image-taking section of shooting the prism,
the three-dimensional position of the measurement point being measured from a three-dimensional position of the prism obtained in the sections of measuring the distance and the angle after imaging the prism with the prism image-taking section for collimating the prism, an inclination direction of the pointing rod obtained by an image obtained from imaging the inclination casing by means of the image-taking section, and the first fixed length.

5. A method of measuring a three-dimensional position of a measurement point,
the method comprising the steps of, by using a pointing rod positioned on the measurement point, a prism fixed at a position deviated by a known first fixed length from the measurement point in an axial direction of the pointing rod, an inclination casing for fixing an analysis pattern which is located at a position deviated by a known second fixed length from the prism in the axial direction of the pointing rod and is located on a plane perpendicular to the axial direction of the pointing rod, and a survey machine including a section of measuring a distance to the prism, a section of measuring an angle, and an image-taking section:

obtaining a three-dimensional position of a prism center of the prism in the sections of measuring the distance and the angle;

calculating a pattern center of the analysis pattern by analyzing an image obtained by imaging the inclination casing;

calculating a positional direction of the inclination casing from the pattern center and the prism center on the image;

calculating a three-dimensional position of the pattern center which is deviated from the three-dimensional position of the prism center by the second fixed length on the positional direction of the inclination casing; and measuring the three-dimensional position of the measurement point by moving positional information from the three-dimensional position of the prism center in a direction along a line between the three-dimensional position of the pattern center and the three-dimensional position of the prism center by the first fixed length.

6. A system of measuring a three-dimensional position of a measurement point, the system comprising:

a pointing rod positioned on the measurement point;

a target fixed at a position deviated by a known first fixed length from the measurement point in an axial direction of the pointing rod;

an inclination casing for fixing an analysis pattern which is located at a position deviated by a known second fixed length from the target in the axial direction of the pointing rod and is located on a plane perpendicular to the axial direction of the pointing rod; and a survey machine including a section of measuring a distance to the target, a section of measuring an angle, and an image-taking section, wherein an inclination casing for fixing an analysis pattern which is located at a position deviated by a known second fixed length from the target in the axial direction of the pointing rod and is located on a plane perpendicular to the axial direction of the pointing rod, a three-dimensional position of the target center is obtained in the sections of measuring the distance and the angle;

a positional direction of the inclination casing is calculated from the pattern center and the target center on the image, a three-dimensional position of the pattern center is calculated which is deviated from the three-dimensional position of the target center by the second fixed length in the positional direction of the inclination casing, and the three-dimensional position of the measurement point is measured by moving positional information from the three-dimensional position of the target center in a direction along a line between the three-dimensional position of the pattern center and the three-dimensional position of the target center by the first fixed length.

7. A system of measuring a three-dimensional position of a measurement point, the system comprising:

a prism fixed at a position deviated by a known first fixed length from the measurement point;

an inclination casing for fixing an analysis pattern which is located at a position deviated by a known second fixed length from the prism in a same direction of the first fixed length and is located on a plane perpendicular to a line between the measurement point and a prism center of the prism; and a survey machine including a section of measuring a distance to the prism, a section of measuring an angle, and an image-taking section, wherein a three-dimensional position of the prism center is obtained in the distance measuring section and the angle measuring section, a pattern center of the analysis pattern is calculated by analyzing an image obtained by imaging the inclination casing, a positional direction of the inclination casing is calculated from the pattern center and the prism center on the image, a three-dimensional position of the pattern center is calculated which is deviated from the three-dimensional position of the prism center by the second fixed length in the positional direction of the inclination casing, and the three-dimensional position of the measurement point is measured by moving positional information from the three-dimensional position of the prism center in a direction along a line between the three-dimensional position of the pattern center and the three-dimensional position of the prism center by the first fixed length.

* * * * *